United States Patent [19]

Schwiete

[11] Patent Number: 5,039,835
[45] Date of Patent: Aug. 13, 1991

[54] ELECTRIC STUD-WELDING DEVICE

[75] Inventor: Bernd Schwiete, Witten, Fed. Rep. of Germany

[73] Assignee: TRW Nelson Bolzenschweiss-Technik GmbH & Co. KG., Gevelsburg, Fed. Rep. of Germany

[21] Appl. No.: 558,809

[22] Filed: Jul. 27, 1990

[30] Foreign Application Priority Data

Jul. 28, 1989 [DE] Fed. Rep. of Germany ....... 3925100

[51] Int. Cl.$^5$ ........................... B23K 9/10; B23K 9/20
[52] U.S. Cl. ........................................ 219/98; 219/132
[58] Field of Search .................................. 219/98, 132

[56] References Cited

U.S. PATENT DOCUMENTS

| 2,175,891 | 10/1939 | Graham | 219/132 |
| 3,932,724 | 1/1976 | Raycher | 219/98 |
| 4,216,367 | 8/1980 | Risberg | 219/132 |
| 4,266,114 | 5/1981 | Hansen | 219/132 |
| 4,415,792 | 11/1983 | Jordan | 219/98 |

Primary Examiner—Clifford C. Shaw
Attorney, Agent, or Firm—Allen D. Gutchess, Jr.

[57] ABSTRACT

This electric stud-welding device includes a welding gun for a stud or bolt to be welding to a workpiece, and a control device. The latter consists of a welding current source and a setting device for welding time and welding current. The welding gun and the control device are connected through two welding current lines. A pilot current circuit is present, using only the two welding current lines (5, 6). Also present is a setting device (10), coordinated with the welding gun (3), which is switched into the pilot current circuit. In the control device (2), there is a sensor (9) which, dependent on the control signals produced by the setting device (10) each time, after the actuation of the selective switches or setters (13, 14) arranged thereon, controls the control device (8), present in the control instrument, for the welding time and the welding current.

9 Claims, 1 Drawing Sheet 5,039,835

ELECTRIC STUD-WELDING DEVICE

The invention relates to an electric stud-welding device, with a setting device for controlling weld current time and intensity.

Such an electric stud-welding device is known. Here, the welding current and welding time are set, by corresponding setters, for example, selective switches, directly on the control device, according to the welding task. A disadvantage is that, in changing the settings, the operator must return each time to the control device, while the place of the welding gun to be used and the control device may be at a relatively great distance from each other.

On the other hand, making the desired settings on the control device by so-called "distance controls" is already known. A disadvantage here is that additional control lines are needed. These additional control lines, over rather great distances, make the stud-welding device unnecessarily expensive. Also, such control lines may mean additional damage.

The invention attacks the problem of improving an electric stud-welding device so that a distance setting on the control device is made possible without additional control lines.

By the fact that a pilot current circuit, effecting the settings on the control device, is superimposed on the welding current circuit with the two welding lines present, additional control lines are eliminated. Through the setting device assigned to the welding gun, the setting of the corresponding setting means on the control device, can be effected from the welding gun. If, in addition, the pilot current circuit source is assigned to the control device, a current source in the welding gun can be avoided. In this way, an increase of the weight of the welding gun is avoided. Moreover, the pilot current source in the control device can be monitored well.

Further developments of the invention appear from the the sub-claims.

The invention is explained in detail below from examples of execution represented in the drawings.

Figure 1:
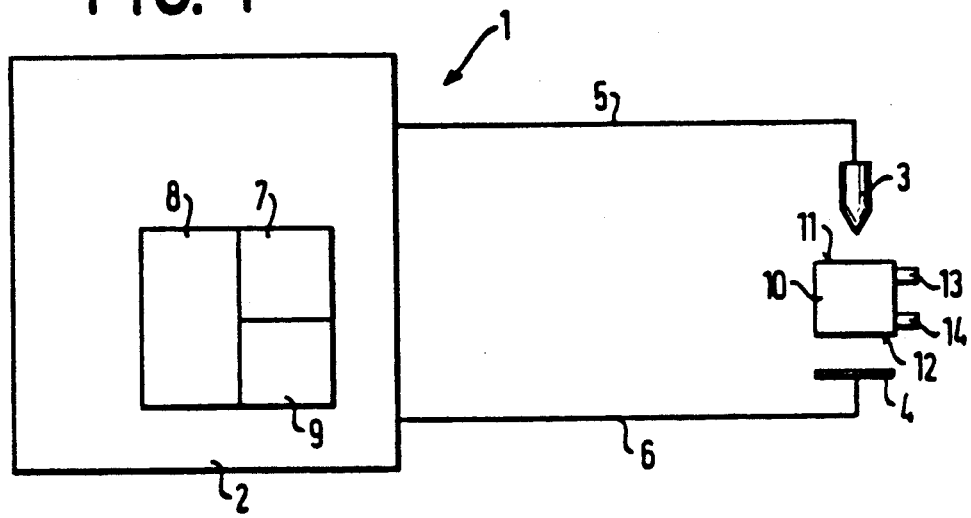
FIG. 1 is a schematic view of an electric stud-welding device according to the invention.

The bolt-welding device 1, represented in FIG. 1, has a control device 2 and a welding gun 3, represented schematically as a stud or bolt. By means of the welding gun 3, a stud, held by the latter, is to welded to a workpiece 4, such as a plate, for example.

Welding gun 3 and workpiece 4 are connected only through two welding current line 5, 6, in the form of cables.

According to the welding task, the welding current flowing through the welding current lines 5, 6 is to be predetermined in its intensity and duration.

For setting the welding current and/or the welding time, the control device 2 has, besides the welding current source, not shown, a current source 7 for a pilot current. This current source 7 can be connected with the two welding current lines 5, 6. The control device 8 also contains setting members, not shown, for the welding current and/or the welding time, as well as a sensor 9, which responds to the flowing pilot current.

For the setting of the welding current and/or the welding time, there is placed between the stud tip in the welding gun 3 and the workpiece 4, a setting device 10. This setting device 10 has, on the upper and lower side, contact surfaces 11, 12. These can be brought into galvanic or electrical contact with the tip of a stud contained in the welding gun 3 or with the workpiece 4.

The setting device 10 has several setters or selective switches, 13 and 14, accessible from outside and operable by hand, for the welding current and welding time, respectively.

The setters switched on, turn on setting means, not shown, in the pilot current circuit, so that the current amplitude or the duration of flowing current, is influenced, for example, by the formation of pulses with different pulse duration and pulse pauses.

In principle, it is also possible to turn on the setting device 10 with setters, that is, with a small current source for the pilot current, in which case, a pilot current source in the control device can be eliminated.

The sensor 9 in the control device 2 responds to the pilot current, varied by the setters 13, 14, and effects, through means not shown, the turning on of the corresponding setting means in the control device 2 for the welding current or welding time.

Figure 2:
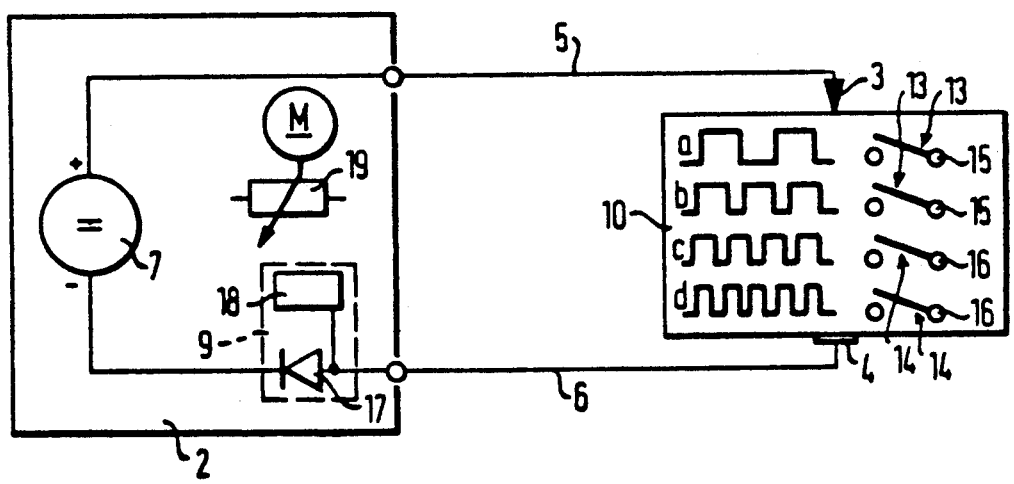
FIG. 2 is a view as in FIG. 1 of a varied form of execution.

In the form of execution according to FIG. 2, the setting device 10 is again switched into the pilot circuit between the welding gun 3 and the workpiece 4. Here, as setters 13, 14, switches 15, 16, operable by hand, are used, which switch elements, not shown, in a pulse former, by which different pulse series a-d result. The pulse series a-d have different pulse widths and pauses.

The pilot current source 7 is, in this case, a direct current source, which delivers a weak direct current for the setting device 10. There is built into the pilot current circuit in the setting device 10, a sensor 9, which contains a diode 17 in the current passage direction and has, connected, a pulse sequence recognition device 18. This pulse sequence recognition device 18 controls a motor-potentiometer 19. This motor-potentiometer 19 effects, in a manner not shown, the influencing of the welding current, which flows into the two welding lines, as to its strength and also duration.

Figure 3:
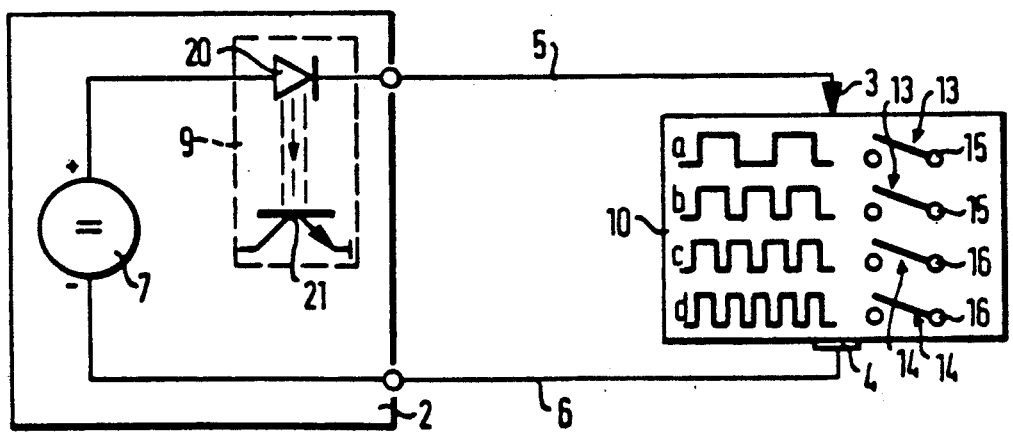
FIG. 3 is a view as in FIG. 1 of another varied form of execution.

In the embodiment according to FIG. 3, the sensor, connected into the pilot current circuit, is an optoelectric sensor with a light diode 20, of which the light currect controls a photo-semiconductor 21. This latter influences a control circuit, not shown, in the control device 2, as to current strength and duration of welding current.

When, through the setting device 10, by means of the sensor 9 and the control device 8, the corresponding welding time and welding duration is set, the setting device 10 is removed. The gun 3 with the stud is set onto the workpiece 4. After releasing the gun switch, the welding current, set to the said values, is discharged.

I claim:

1. In combination, an electric stud-welding control and a welding gun for welding a stud to a workpiece, said stud-welding control comprising a first control device, only two welding current lines connecting said welding gun and said control device, a setting device which can be positioned between a stud held by the stud-welding gun and a workpiece, said setting device having two spaced conductors, one for making electrical contact with the stud held by the stud-welding gun and one for making electrical contact with the workpiece, said setting device having adjustable setters therein connected with said conductors for sending control signals through said welding current lines, a sensor in said control device for receiving the control signals from said setting device, and a second control device in said first control device and responsive to said sensor to control the time and intensity of welding current supplied from said first control device to the stud-welding gun and the workpiece.

2. The combination according to claim 1 wherein said first control device has a current source for a pilot current with said current source being connected with said two welding lines, said setting device sensing the pilot current.

3. The combination according to claim 2 wherein said current source is a direct current source.

4. The combination according to claim 1 wherein said sensor comprises a potentiometer.

5. The combination according to claim 1 wherein said sensor comprises an optoelectric device.

6. In combination, an electric stud-welding control and a stud-welding gun for welding a stud to a workpiece, said stud-welding control comprising a control device, two welding current lines connecting said welding gun and said control device, a setting device which can be positioned between a stud held by the stud-welding gun and a workpiece, said setting device having two spaced conductors, one for making electrical contact with the stud and one for making electrical contact with the workpiece, said setting device having adjustable selector switches connected with said conductors for sending control signals through said welding current lines, and sensing means in said control device for receiving the control signals from said setting device and for controlling one of the time and intensity of welding current supplied from said control device to the stud-welding gun and the workpiece.

7. The combination according to claim 6 wherein said control device has a currect source for a pilot current with said current source being connected with said two welding lines, said setting device sensing the pilot current.

8. The combination according to claim 6 wherein said sensing means comprises a potentiometer.

9. The combination according to claim 6 wherein said sensing means comprises a photoelectric device.

* * * * *